W. E. BERTRAM.
MONOLINE COMPOSING MACHINE.
APPLICATION FILED MAY 13, 1910.
997,735.
Patented July 11, 1911.
11 SHEETS—SHEET 1.
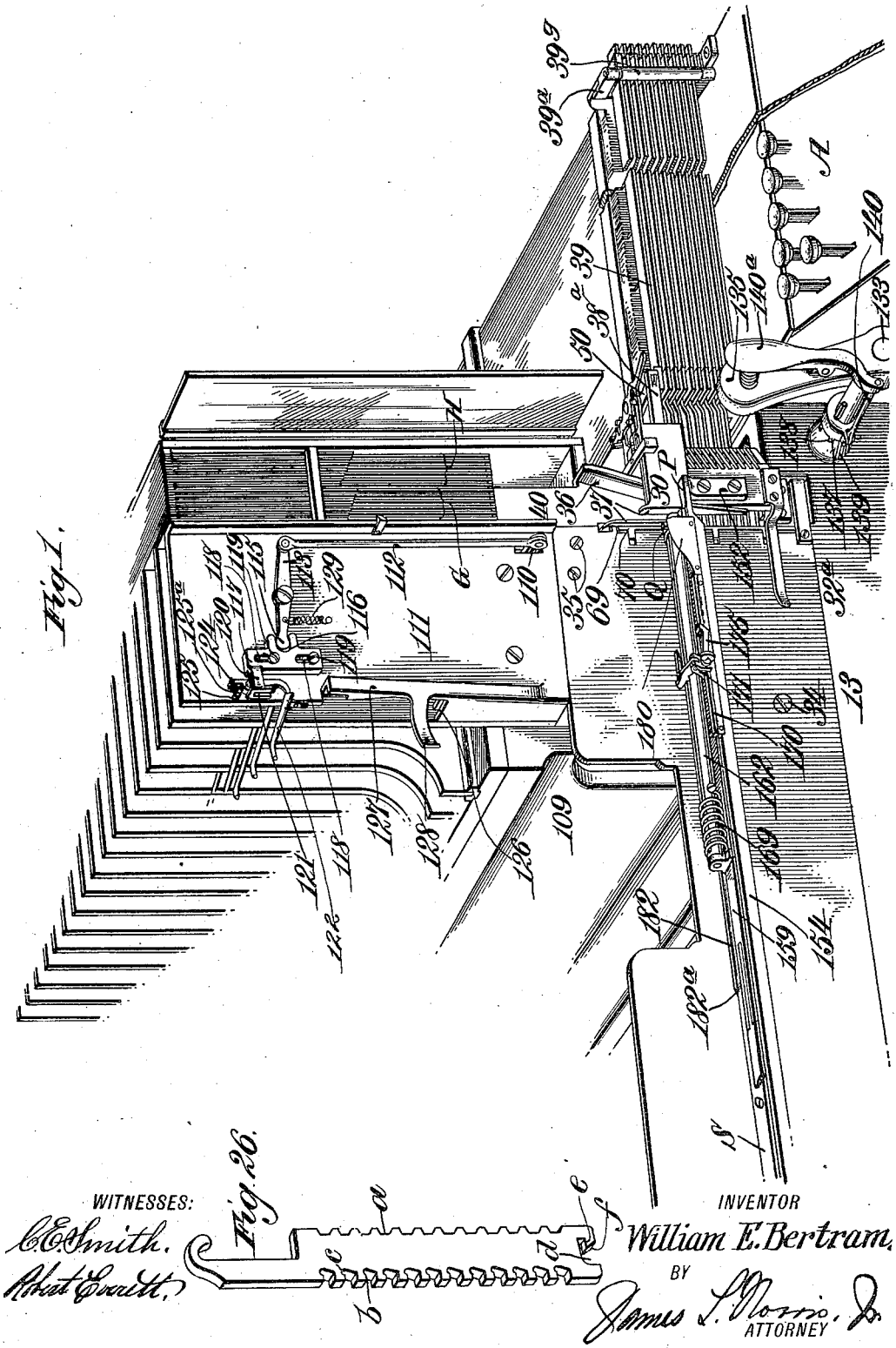
WITNESSES:
INVENTOR
William E. Bertram,
BY
ATTORNEY

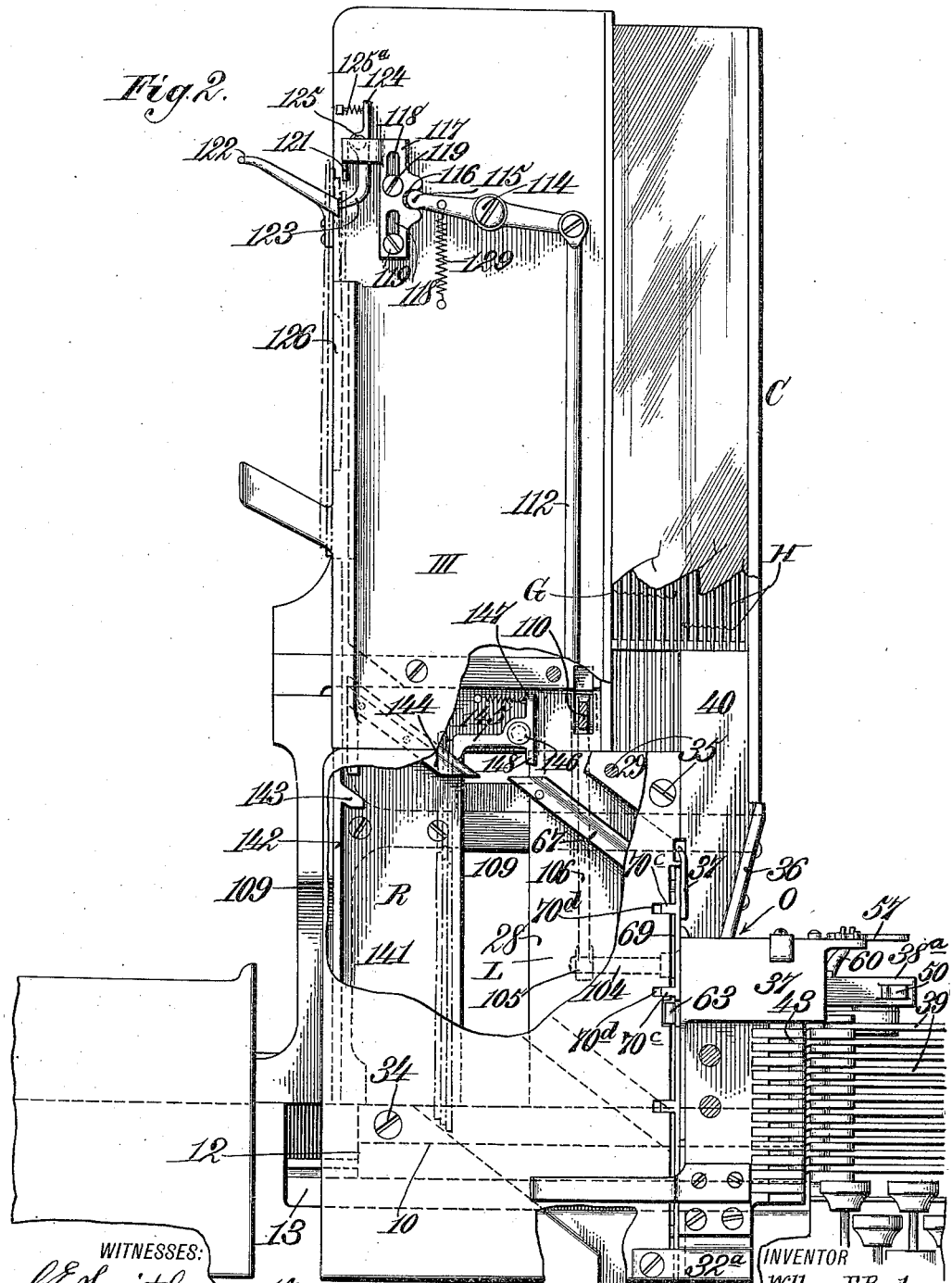

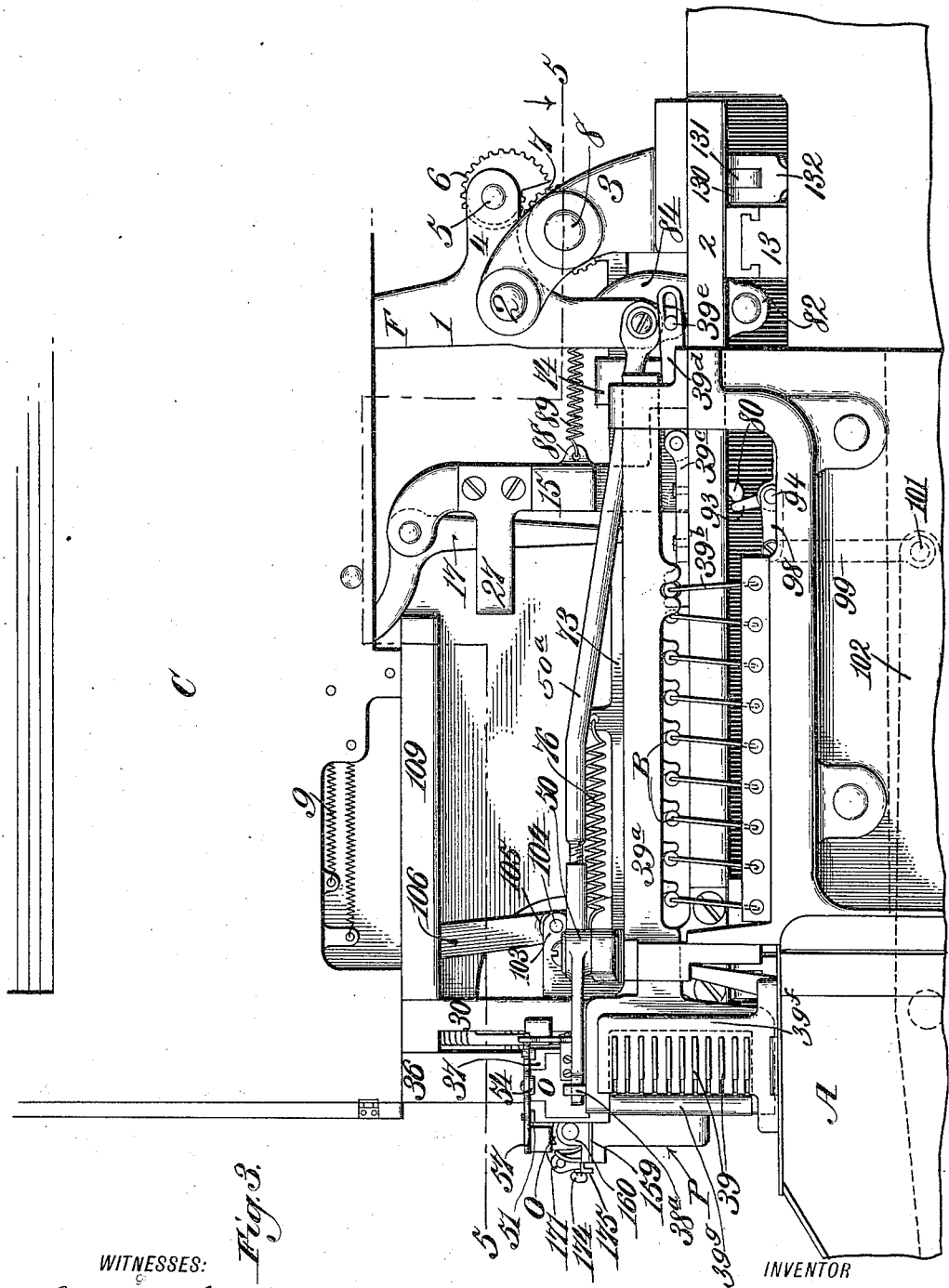

W. E. BERTRAM.
MONOLINE COMPOSING MACHINE.
APPLICATION FILED MAY 13, 1910.
997,735.
Patented July 11, 1911.
11 SHEETS—SHEET 4.
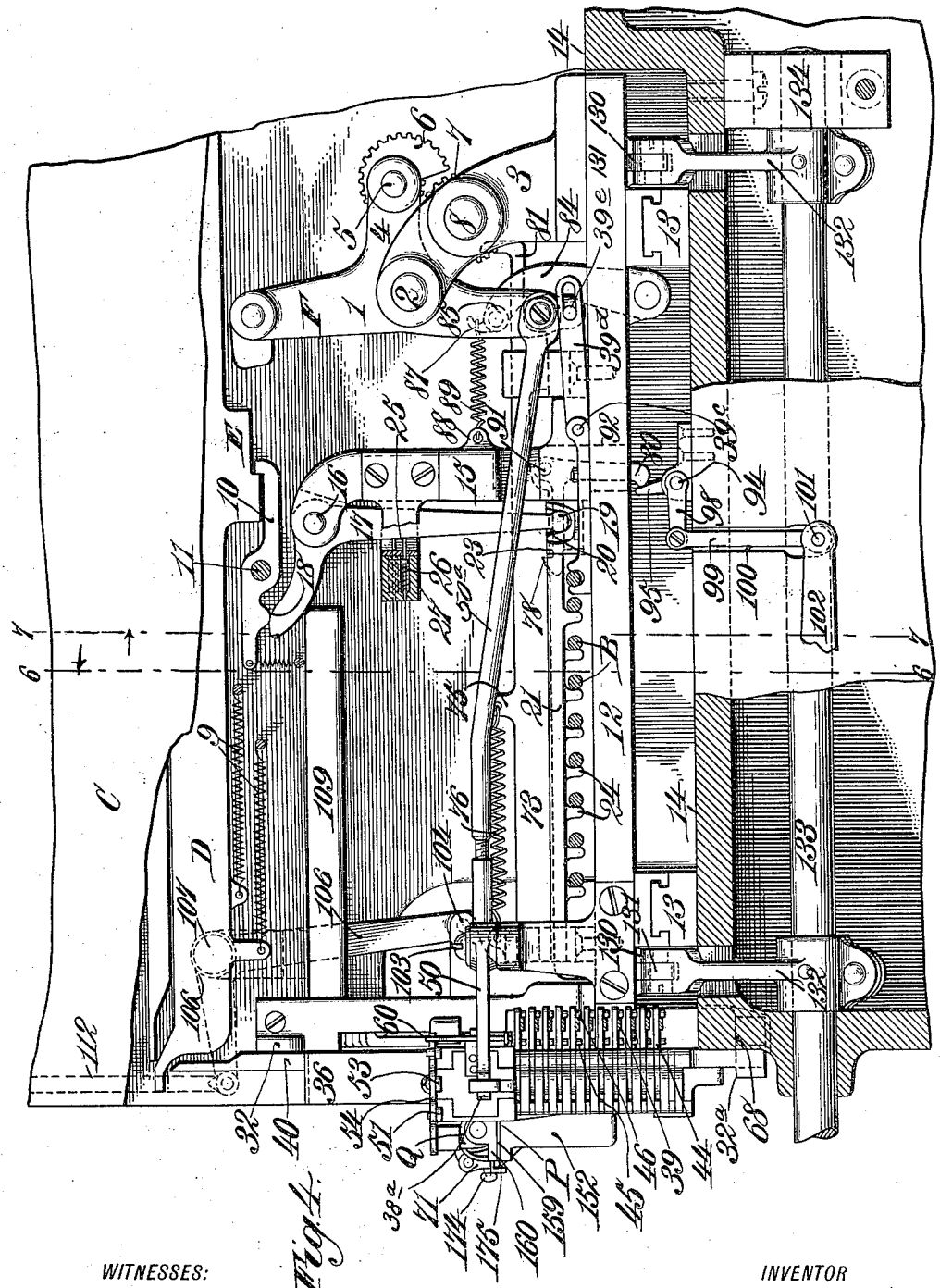
WITNESSES:
C. E. Smith.
Robert Everitt.
INVENTOR
William E. Bertram.
BY
James L. Norris
ATTORNEY W. E. BERTRAM.
MONOLINE COMPOSING MACHINE.
APPLICATION FILED MAY 13, 1910.
997,735.
Patented July 11, 1911.
11 SHEETS—SHEET 5.
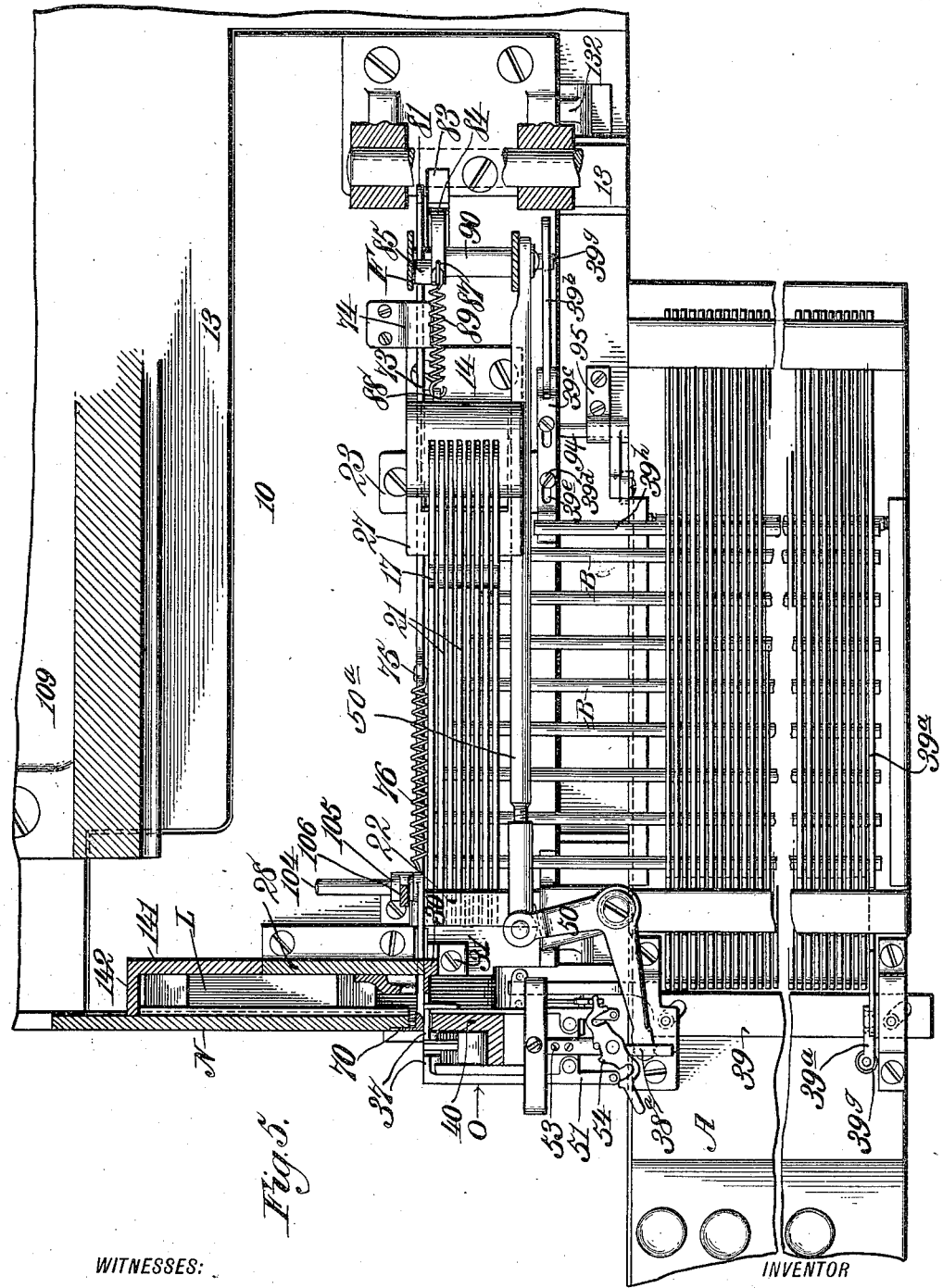
WITNESSES:
C. E. Smith.
Robert Everett.
INVENTOR
William E. Bertram.
BY
James L. Norris
ATTORNEY

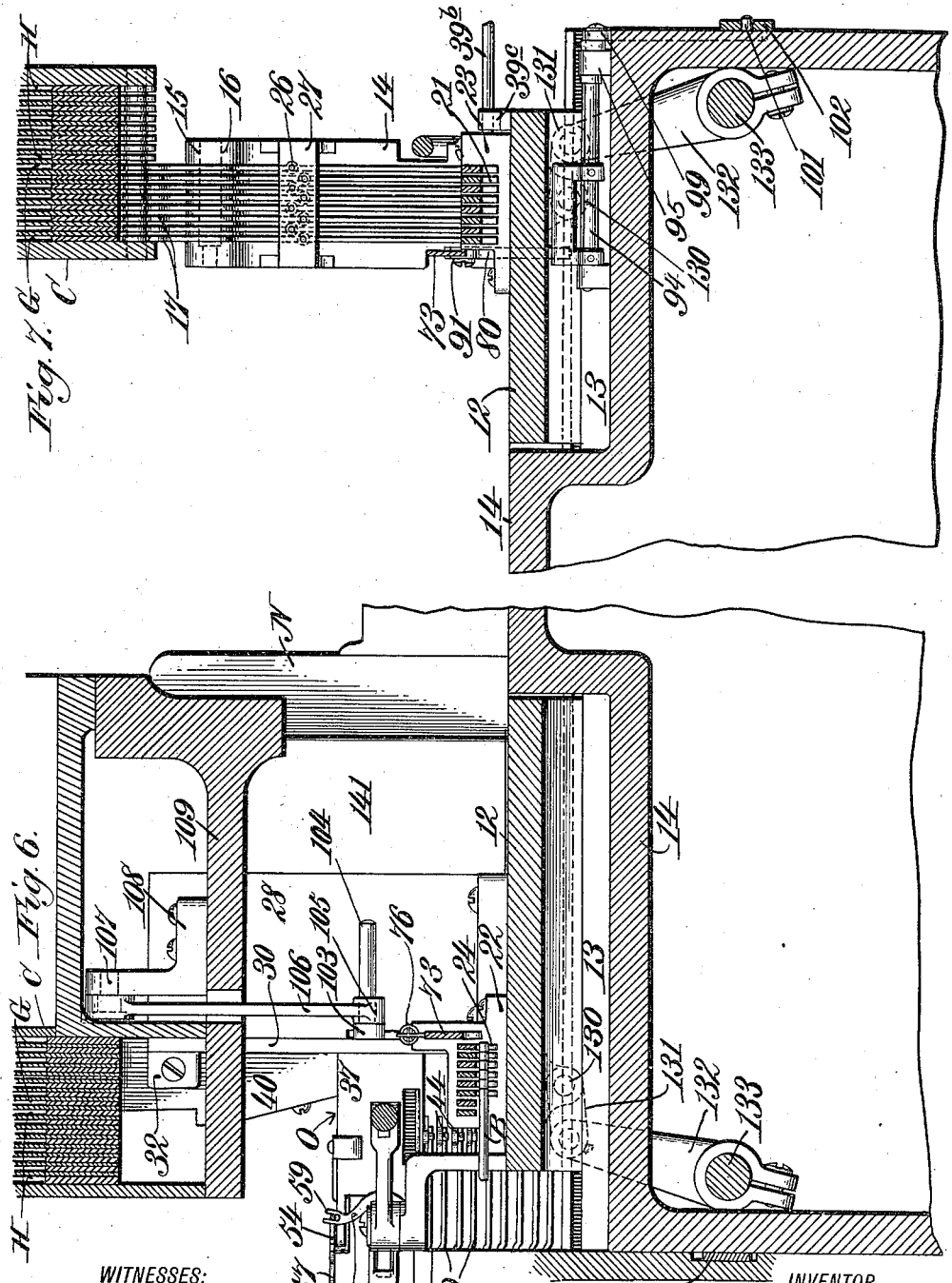

W. E. BERTRAM.
MONOLINE COMPOSING MACHINE.
APPLICATION FILED MAY 13, 1910.
997,735.
Patented July 11, 1911.
11 SHEETS—SHEET 7.
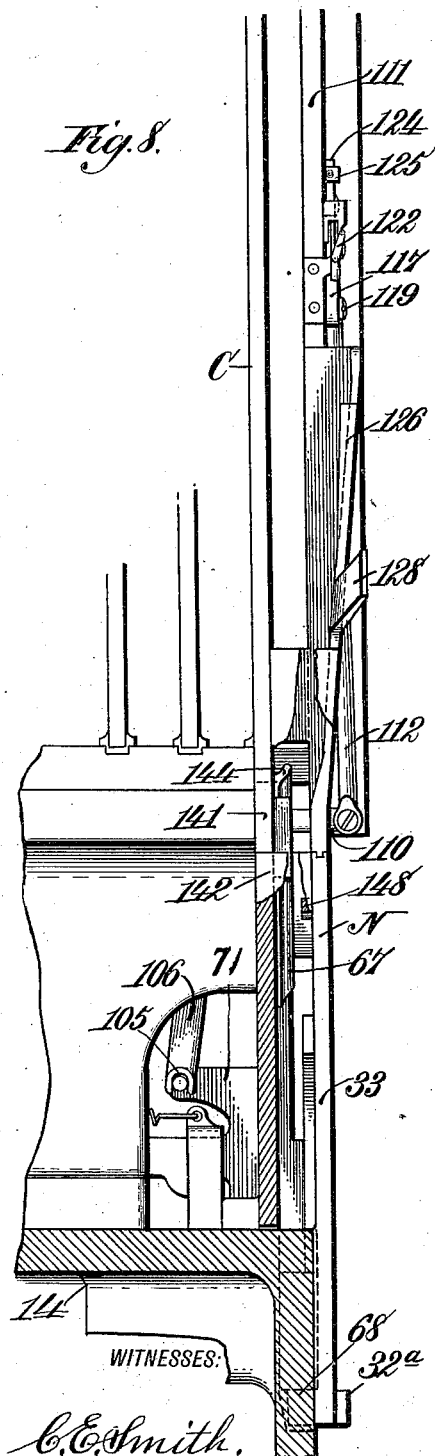
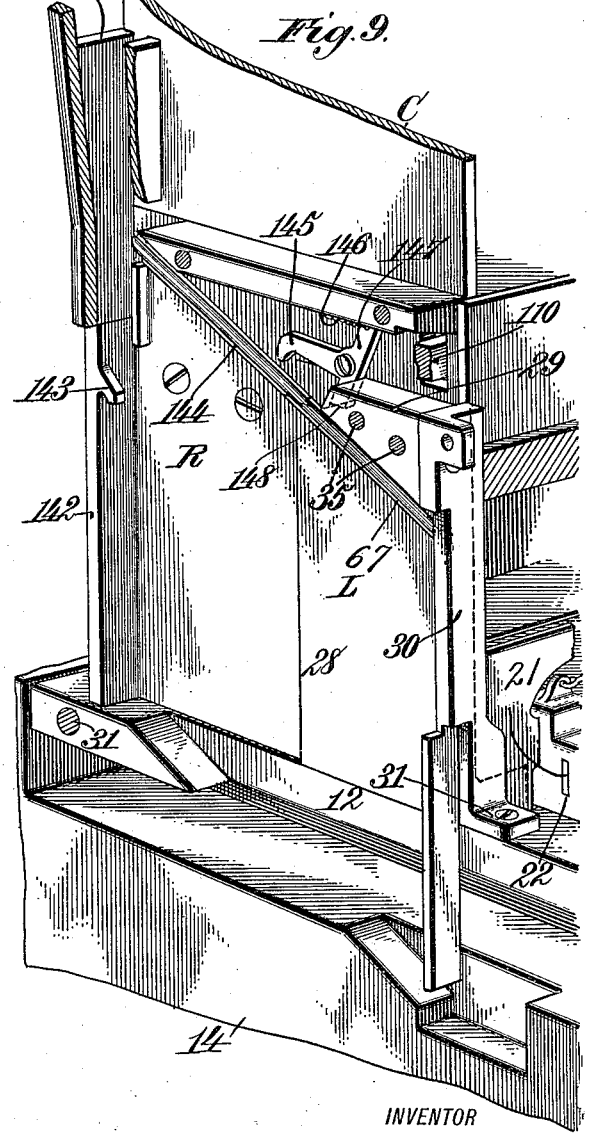
INVENTOR
William E. Bertram.
BY
ATTORNEY W. E. BERTRAM.
MONOLINE COMPOSING MACHINE.
APPLICATION FILED MAY 13, 1910.
997,735.
Patented July 11, 1911.
11 SHEETS—SHEET 8.
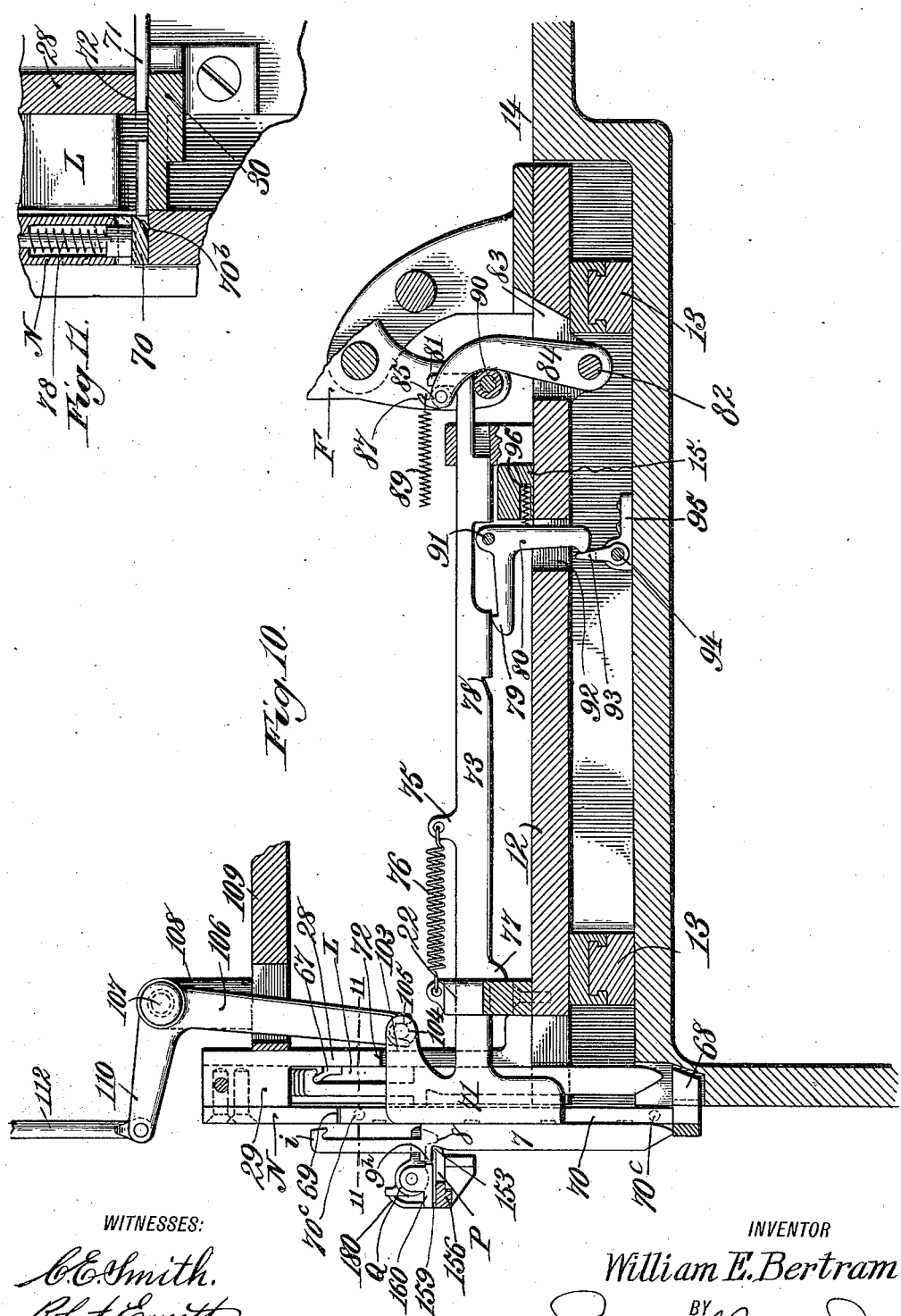
WITNESSES:
C. E. Smith.
Robert Everitt.
INVENTOR
William E. Bertram.
BY
James L. Norris
ATTORNEY

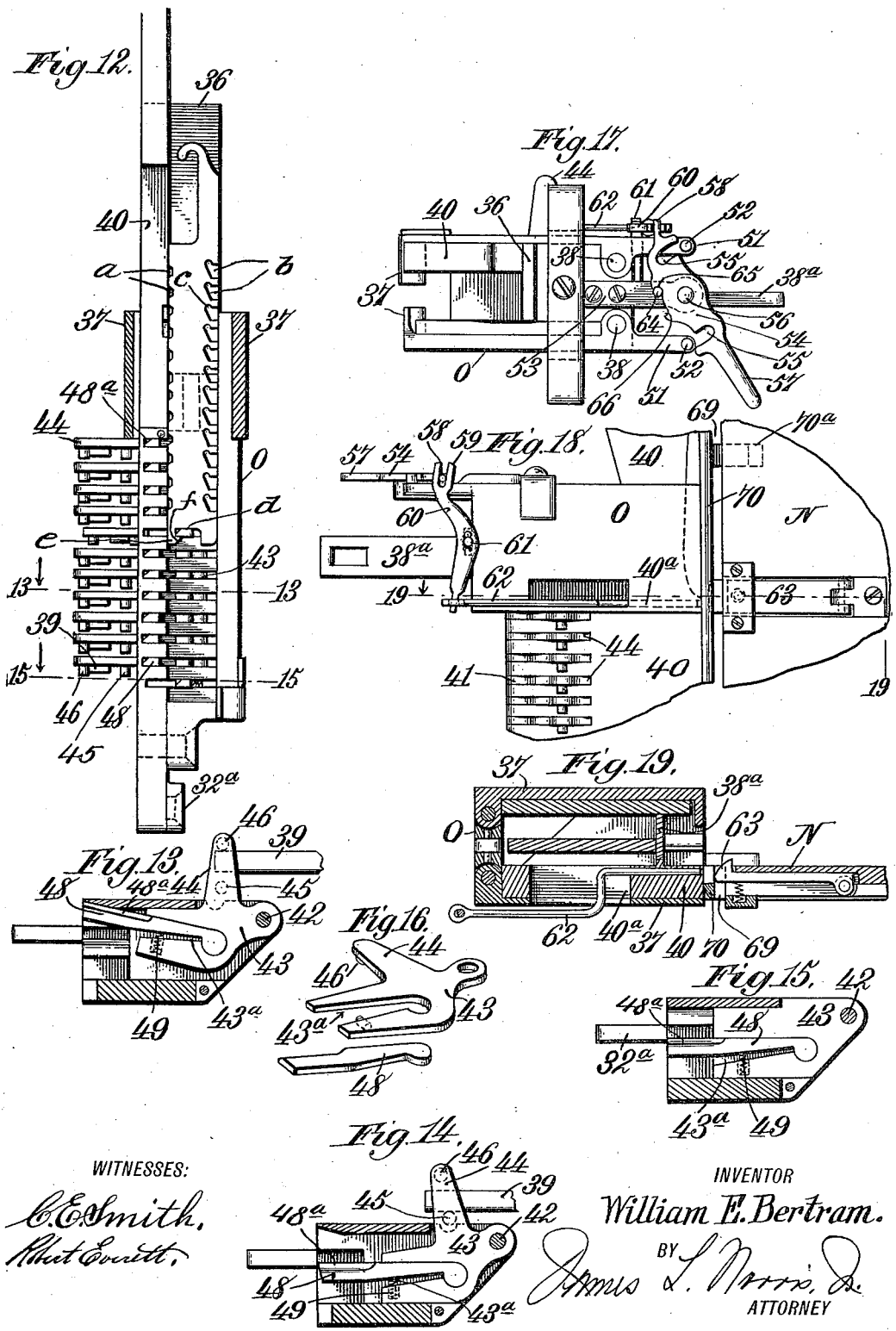

W. E. BERTRAM.
MONOLINE COMPOSING MACHINE.
APPLICATION FILED MAY 13, 1910.
997,735.
Patented July 11, 1911.
11 SHEETS—SHEET 10.
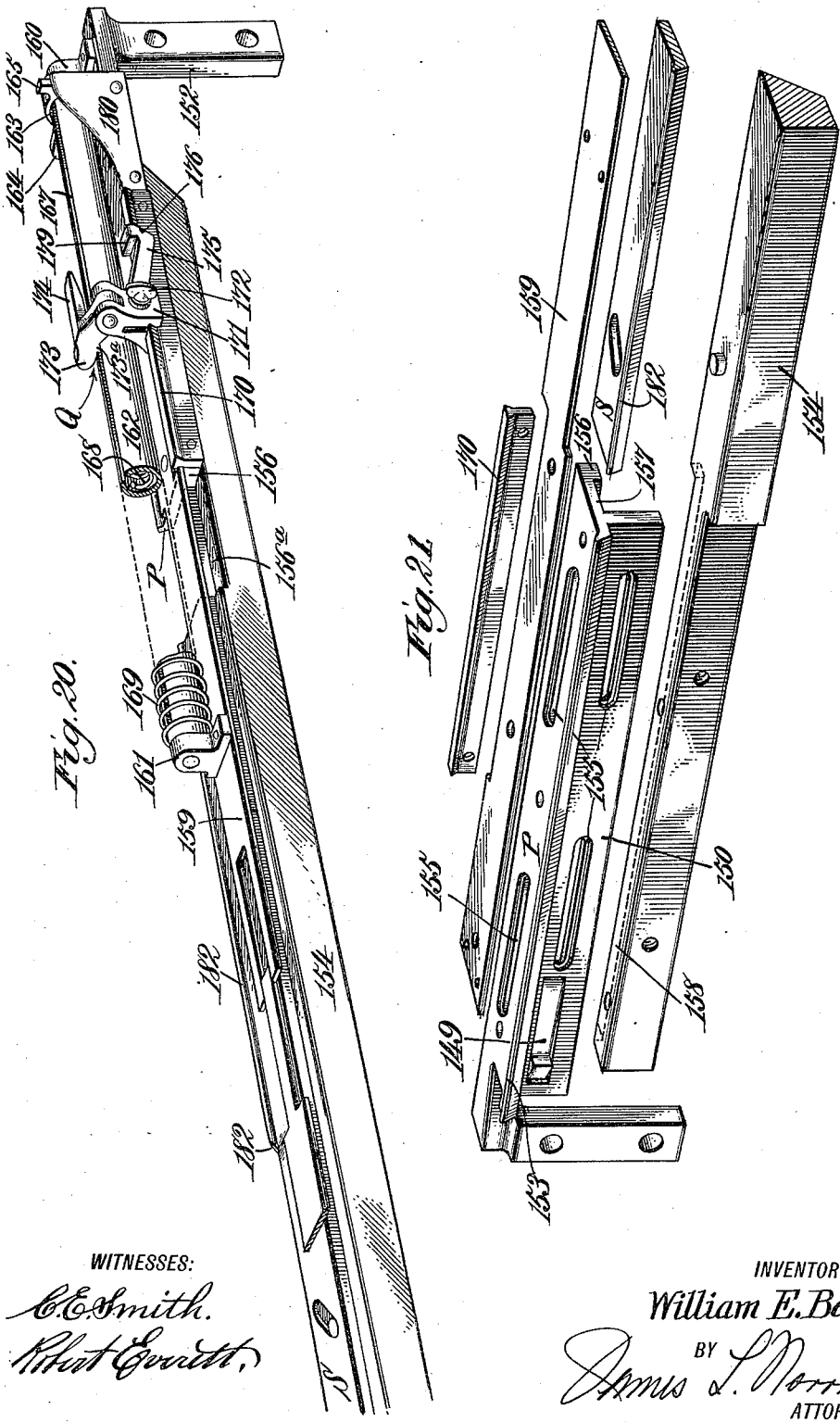
WITNESSES:
INVENTOR
William E. Bertram.
BY
ATTORNEY W. E. BERTRAM.
MONOLINE COMPOSING MACHINE.
APPLICATION FILED MAY 13, 1910.
997,735.
Patented July 11, 1911.
11 SHEETS—SHEET 11.
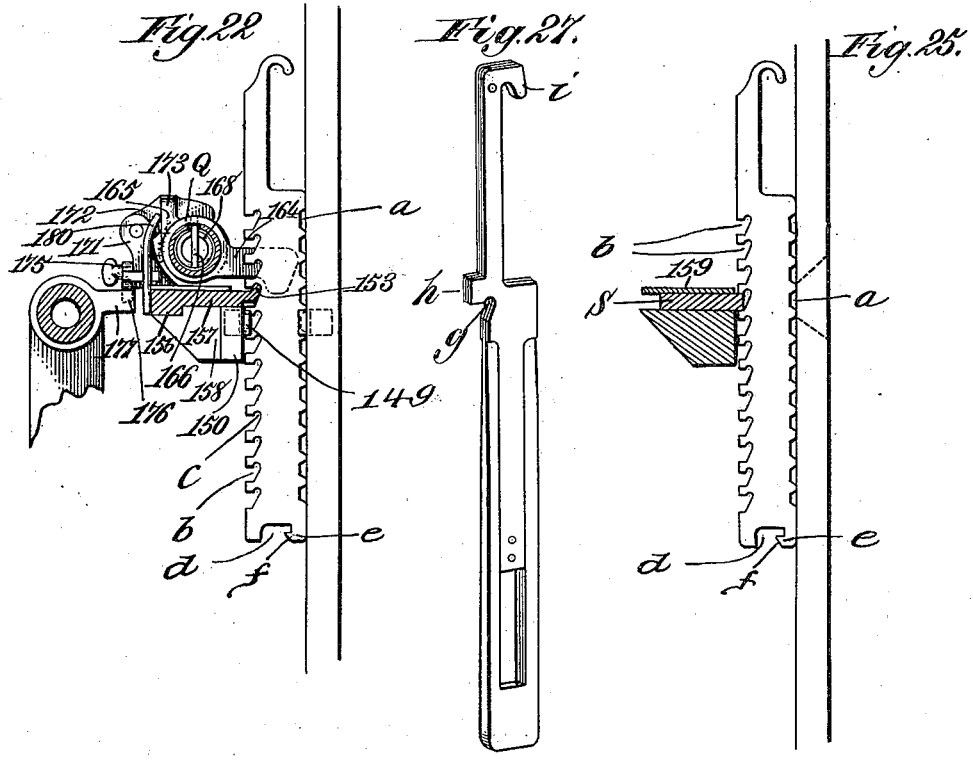
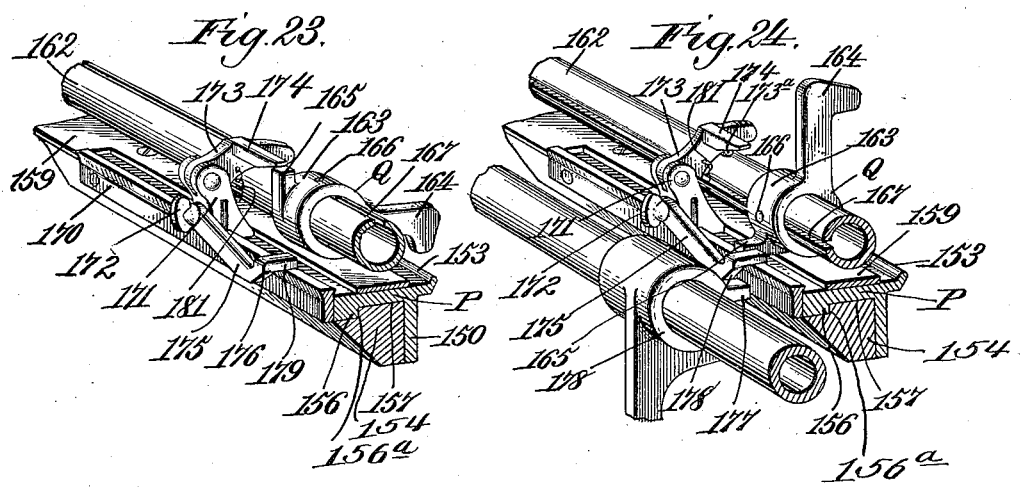
WITNESSES:
C. E. Smith.
Robert Everett.
INVENTOR
William E. Bertram.
BY
James L. Norris
ATTORNEY

UNITED STATES PATENT OFFICE.

WILLIAM ERNEST BERTRAM, OF BROOKLYN, NEW YORK, ASSIGNOR TO HERMAN RIDDER, OF NEW YORK, N. Y.

MONOLINE COMPOSING-MACHINE.

997,735.  Specification of Letters Patent.  Patented July 11, 1911.

Application filed May 13, 1910. Serial No. 561,128.

*To all whom it may concern:*

Be it known that I, WILLIAM ERNEST BERTRAM, a citizen of the United States, residing at Brooklyn, in the county of Kings and State of New York, have invented new and useful Improvements in Monoline Composing-Machines, of which the following is a specification.

My present invention relates to improvements in line composing and type-casting machines and more especially to those of the monoline type as disclosed in Letters Patent, No. 506,198 granted to W. S. Scudder, October 3, 1893, and it has for its object primarily to provide a generally improved machine of this type which is adapted and capable of holding two or more fonts of matrices and which embodies mechanisms which may be quickly and easily adjusted by the operator whereby matrices from any desired font may be selected and delivered from the magazine and composed and assembled preparatory to the casting operation, the construction of the machine and the relative positions and adjustments of the operative parts enabling all of the operations to be performed or controlled with facility and by the manipulation of a single or common keyboard.

Another object of the invention is to provide an improved composing box which embodies means for arresting the matrix bars in such a manner as to prevent rebounding thereof and which also comprises movable wings or sections together with means for quickly opening them to permit a matrix that has been delivered by mistake to the assembling point to be easily removed without disturbing the remainder of the assembled line, means being also provided which is operative automatically by the opening of the composing box to retract the detent which holds the assembled line of matrices.

A further object of the invention is to provide an improved box for receiving, and chamber for storing the necessary number of space bands, means for feeding the space bands into the assembled line and for returning the space bands to the storage box or chamber after each cast, the construction and arrangement of the mechanism for handling the space bands being such that the above operations shall be performed correctly irrespective of the positions occupied by the relatively shiftable parts of the machine.

To these and other ends, the invention consists in certain improvements, and combinations and arrangements of parts, all as will be hereinafter more fully described, the novel features being pointed out particularly in the claims at the end of the specification.

In the accompanying drawing: Figure 1 is a perspective view of the major portion of a monoline composing machine constructed in accordance with my present invention; Fig. 2 is a front elevation of a portion of the machine including the matrix magazine and the space box or chamber, the parts being shown in relative shifted position; Fig. 3 represents a side elevation of the machine as viewed from the right in Fig. 1; Fig. 4 is a view similar to Fig. 3, the keyboard, however, being removed and parts being shown in section to illustrate more clearly certain features of the machine; Fig. 5 represents a section on the line 5—5 of Fig. 3; Fig. 6 represents a section on the line 6—6 of Fig. 4 and looking in the direction of the arrows; Fig. 7 represents a section taken on the line 7—7 of Fig. 4 and looking in the direction of the arrows; Fig. 8 is an elevation of a part of the machine as viewed from the left in Fig. 1 and showing in detail the devices for returning the space bands to the storage box or chamber; Fig. 9 is a detail perspective view of the space box with the face plate removed, the two shiftable sections of the space box being shown in coöperative relation in this figure; Fig. 10 is a detail sectional view of the action or mechanism for feeding the space bands into the assembling line; Fig. 11 represents an enlarged sectional view on the line 11—11 of Fig. 10 showing a part of the space-feeding mechanism on an enlarged scale; Fig. 12 is a detail side elevation of the composing box, the wings thereof being broken away for clearness in illustration, a matrix is shown delivered into the box, and one of the matrix-arresting stops is shown in engagement with the matrix; Fig. 13 represents a transverse section through the composing box on the line 13—13 of Fig. 12, the matrix-arresting stop being shown in retracted position;

Fig. 14 is a view similar to Fig. 13, the matrix-arresting stop, however, being shown in position to receive a matrix; Fig. 15 represents a section through the composing box on the line 15—15 of Fig. 12 showing the lowermost and stationary matrix-arresting stop; Fig. 16 is a detail perspective view of the parts of one of the matrix-arresting stops; Fig. 17 is a top plan view of the composing box showing the movable wings and the means for opening the same; Fig. 18 is a rear elevation of the composing box; Fig. 19 represents a section on the line 19—19 of Fig. 18 showing the means for retracting the detent in the face plate; Fig. 20 is a perspective view of the assembling carriage and the alining bar, the parts being shown in detail and on an enlarged scale; Fig. 21 is a collective view showing in perspective the elements of the assembling bar; Fig. 22 represents a transverse section through the assembling carriage and assembling bar and showing the manner in which the latter coöperates with each matrix; Fig. 23 is a perspective view of a portion of the assembling carriage showing in detail the means for tripping the same and releasing the assembled line of matrices; Fig. 24 is a view similar to Fig. 23, the assembling carriage, however, being shown in tripped position and out of the path of the assembled line of matrices; Fig. 25 represents a section of the alining bar showing diagrammatically the manner in which the same coöperates with each matrix at the casting point; Fig. 26 is a perspective view of one of the matrix bars; and Fig. 27 is a perspective view of one of the space bands.

Similar parts are designated by the same reference characters in the several views.

The present improvements are particularly applicable to line composing and typecasting machines of the monoline type, the principal objects of the present invention being to materially increase the capacity of monoline machines of the type disclosed in the Scudder patent above mentioned, and to improve the construction of such machines and the operation thereof. There are, however, certain features of my invention which could be used independently of other features of the machine and, moreover, certain features of the present invention may be found useful in connection with composing machines of other types. It will therefore be understood that the invention is not necessarily limited to the complete organization shown and, moreover, it is not necessarily limited to machines of any specific type although, as before stated, it is particularly useful in connection with machines of the monoline type.

In the present embodiment of the invention, A designates the keyboard the keys of which are operatively connected to the magazine pawls or gates whereby the matrices may be selected and delivered from the magazine as desired. This keyboard is similar in general to that disclosed in detail in the Scudder patent above mentioned, the bail rods B, however, being prolonged in the present instance in order that an operative connection may be maintained between the keyboard and the relatively shiftable matrix-selecting and delivering devices, as will hereinafter appear. The magazine C may be similar to that disclosed in the Scudder patent it, however, being made larger in the present instance and divided into a suitable number of channels to accommodate the different kinds of matrices making up a plurality of fonts. While it will be evident that the machine can be adapted to accommodate several fonts of matrices, I have shown the machine in the present instance as adapted to accommodate two fonts of matrices, and while the machine as adapted for two fonts of matrices will be described in detail, it will be understood that the invention is not limited in this respect. The present machine is adapted to operate with the multiple letter matrix bars of the general type disclosed in the Scudder patent and, in the present instance the machine is adapted to receive eight matrix bars for each font, there consequently being sixteen channels or compartments in the magazine C for the storage of two fonts of matrices.

Each channel of the magazine is provided with a magazine pawl D and these magazine pawls may be similar to those disclosed in the Scudder patent, except that a supplemental shoulder E is provided on the under side of each magazine pawl and is adapted to be engaged by the oscillator F. This oscillator may be of any suitable construction, it embodying in the present instance a frame 1 which is pivoted on an axis 2 supported by a bracket 3, and the frame 1 is provided with a rearwardly projecting portion 4 having a shaft 5 on which is mounted a volute or cam-shaped gear 6, this cam-shaped gear being normally disengaged from an ordinary spur gear 7 carried by a continuously revolving shaft 8, but when the upper portion of the frame 1 of the oscillator is moved rearwardly by the shoulder E on one of the magazine pawls when the latter is released, the cam-shaped gear 6 will be caused to mesh with the revolving gear 7 and the latter will operate upon the cam-shaped gear to shift the upper portion of the oscillator frame 1 forwardly or toward the left in Figs. 3 and 4, thereby causing the oscillator to restore the released magazine pawl to normal locked or closed position, the gears 6 and 7 automatically disengaging upon the completion of each resetting operation. Each magazine pawl is provided as usual with a tension spring 9 which tends to operate it in a direction to release a matrix bar from the respective channel of the magazine. Each magazine pawl, however, is normally retained in closed position by a detent 10, there being in the present instance sixteen detents which are individual to a corresponding number of magazine pawls, and all of these detents may be conveniently mounted upon a common shaft 11.

The magazine together with its pawls and detents is mounted in fixed relation upon the frame of the machine and upon reference to Figs. 1 and 2, it will be observed that one-half G of the magazine space is adapted to contain matrices for one font, while the remaining half H of the magazine space is reserved for matrices of a second font, and in order that matrices may be selected and delivered from either one of the sections of the magazine from the single or common keyboard A, the present invention provides a shiftable mechanism between the keyboard and the magazine which includes detent levers which are adapted to be positioned in operative relation with the detents for the magazine pawls which deliver matrices from one or another font, and such mechanism will be hereinafter described in detail.

Matrix bars similar to those disclosed in the above-mentioned Scudder patent may be used in connection with the present machine, each bar being provided on one edge with a series of twelve characters $a$ while the opposite edge of the bar which coöperates first with an assembling bar and subsequently with an alining bar is provided with a corresponding series of notches $b$. These notches are all of uniform size and their upper and lower walls are spaced a distance corresponding precisely to the thickness of the coöperating alining bar whereby the latter may retain the assembled line of matrices with their characters in accurate alinement during the casting operation. In order to maintain a precisely correct fit of these notches $b$ of the matrices upon the alining bar, I provide an improved construction for the matrix bar whereby all wear is relieved from those surfaces of the notches $b$ which coöperate with the alining bar. This result is accomplished by sloping the inner wall of each notch inwardly toward its upper end and extending it upwardly beyond the upper wall of the corresponding notch to form a rounded pocket or recess $c$ which receives a correspondingly shaped rib on the assembling rail as will be hereinafter described. Another novel and advantageous feature in the construction of the matrix bar involves the provision of a recess $d$ in the bottom thereof and a hook $e$ which underhangs the recess $d$ and is beveled at $f$ to form a latch which is adapted to coöperate with the arresting stop and thereby prevent rebounding as the matrices drop into assembling position. The construction of the matrix bar is shown clearly in Fig. 26.

The space bands may be similar to those disclosed in the Scudder patent above mentioned, but I prefer to provide each space band with a rounded undercut recess or pocket $g$ beneath the lug $h$ thereon, and this rounded recess or pocket is also adapted to travel along a correspondingly shaped rib on the assembling rail as will be hereinafter described.

As previously indicated, the group G comprising the first eight channels at the left of the magazine is adapted to contain matrices of one font while the group H includes the remaining eight channels toward the right of the magazine to contain the matrices of a second font, and the present invention provides simple and efficient mechanism for operatively connecting the single or common keyboard A with either section of the magazine and, moreover, the change from one font to another can be made quickly and without the necessity of removing or substituting any parts of the machine. In order to provide a relatively simple and efficient mechanism for accomplishing these results, I mount certain operative elements of the machine on a horizontally shiftable carrier 12 which in the present instance is in the form of a plate and is mounted to slide on suitable coöperating guides 13. This shiftable carrier 12 and its guides are preferably arranged in a depression in the top surface of the main stationary frame 14 of the machine, the top of the shiftable carrier 12 being preferably flush or substantially so with the top surface of the machine frame, as shown in Figs. 4, 6 and 7. This shiftable carrier 12 carries the detent levers which serve to release the detents for the magazine pawls and for this purpose, a bracket 15 is mounted in fixed relation on the shiftable carrier, and this bracket supports a shaft 16 on which a set of eight detent levers 17 are mounted. The upper ends of the detent levers are extended forwardly and rounded as at 18 so as to engage and properly release the respective detents 10. The lower end of each detent lever is provided with a rounded or otherwise suitably formed head 19 and coöperates with a slot 20 of the respective actuating bar 21, one of these actuating bars being provided for each detent lever, and the bars 21 are guided to reciprocate in slotted blocks 22 and 23 which are fixed to the shiftable carrier 12. These bars 21 are provided on their under sides with lugs 24 and the bail rods B coöperate with such lugs so that when a key of the keyboard is depressed, it rocks forwardly its respective bail rod and the bail rod so operated acts upon the lug 24 of its respective actuating bar 21 and the latter in turn acts upon the corresponding detent lever which lever serves to trip its respective detent, permitting the corresponding magazine pawl to be released. The magazine pawl will then be retracted under the action of its spring 9, thereby releasing the selected matrix, and the matrix so released drops by gravity into the composing box. The magazine pawl so released is immediately returned to its normal locked position by the oscillator as previously described.

The bail rods B are prolonged as previously stated for the purpose of maintaining an operative relation with the actuating bars 21 irrespective of the position of the carrier 12, the bars 21 being shiftable with the carrier. Each detent lever and its corresponding actuating bar after performing the operation above described is returned to and held in inoperative position by a plunger 25 which is acted on by a spring 26, and such plungers and their coöperative springs are supported relatively to the detent levers by a bracket 27 which is fixed to the bracket 15 on the shiftable carrier. These spring-pressed plungers moreover remain in engagement with the respective detent levers and thereby prevent vibration of the parts during the operation of the machine. The oscillator F for resetting the magazine pawls is mounted on and movable with the shiftable carrier as shown in Fig. 4. The shiftable carrier also supports and carries with it a space box together with mechanism for delivering the space bands to the assembling line, the composing box and its related parts, and the carrier is also attached to a section of the alining bar and the assembling carriage.

According to the present invention, the space box is divided into two sections, one section of which is carried by and movable with the shiftable carrier, while the other section of the space box is mounted in stationary relation upon a relatively fixed part of the machine frame. When the shiftable carrier occupies one position, these sections of the space box are united as a single unit, but when the carrier is shifted so as to bring a second font of matrices into use, that section of the space box which is mounted on and movable with the carrier forms in itself a storage chamber to contain the necessary number of spacers or space bands. That section of the space box which is movable with the carrier is composed in part of an upright plate 28 which is rigidly attached at 31 to the carrier and forms the rear face of the space box. The upper portion of this plate 28 carries a lug 29, the purpose of which will be hereinafter described. To this lug 29 is fastened a plate 30 which is arranged at right angles to the plate 28 and forms the inner end of the space box. The plate 30 is connected at its upper end to the rear side of the composing box 32 while the lower portion of the composing box is fastened to a face plate 33 for the space box. This face plate 33 for the space box is fastened at 34 to the shiftable carrier, the upper portion of the face plate being secured to the plate 28 by screws 35 which may be connected to the lug 29. Consequently, when the carrier is shifted, the face plate for the space box and also one section of the space box will move with the carrier.

The composing box 32 may be similar in its general construction and principle of operation to that disclosed in the patent aforesaid, this composing box according to the present invention forming a receiver for the matrices as they are selected and released from the magazine. The top of the box may be provided with a guard 36 to guide the matrices so as to insure their proper entrance into the composing box. The composing box also embodies a pair of opposed wings 37 which are mounted to swing on centers 38 in order to permit the box to be opened and closed. The composing box is provided as in the patent with a plunger 38$^a$, this plunger being operative to open the composing box and to eject the matrix therefrom in the manner shown and described in said patent.

The composing box is provided with a set of arresting stops which correspond in number to the number of characters borne by each multiple letter matrix bar, and these stops are suitably actuated by the keyboard at the same time the matrix is selected and released from the magazine, the function of the arresting stop being to engage the falling matrix and arrest it at an elevation that will bring the desired character thereon into position for the subsequent casting operation. The matrix-arresting stops are provided for this purpose with a set of actuating bars 39. These bars 39 are actuated or set appropriately by the keyboard and they in turn operate to set the corresponding arresting stops in the path of the descending matrix. The matrix-arresting stops are arranged in superposed relation in the rear wall 40 of the composing box, this rear wall 40 being slotted as at 41 to receive a number of arresting stops corresponding to the number of characters on the matrix bar. The arresting stops are in the form of blades 43 which may all be conveniently pivoted on a common center 42, and each blade is provided with an arm 44 which extends laterally through the slots in the composing box and are provided each with a pair of opposed projections 45 and 46 which are disposed at corresponding sides of the actuating bar 39. Each blade 43 forming part of an arresting stop is provided with a recess 43$^a$ and this recess contains a pawl 48 one end of which may be formed circular so as to movably fit within the blade 43, and a compression spring 49 is fitted into one wall of the recess 43ª and bears upon the pawl 48 with a yielding pressure. One of the upper corners of the pawl 48 is beveled as at 48ª, and this beveled portion of the pawl is adapted to be engaged by the beveled surface $f$ on the foot of each matrix, when the pawl is set in the path of the descending matrix.

The actuating bars 39 for the matrix-arresting stops are in the present instance located in rear of the composing box and when these bars are pressed forwardly, they come in contact with the projections 45 on the respective stops and thereby shift the pawls 48 into the path of the descending matrices. When these bars 39 are moved rearwardly, they coöperate with the projections 46 and thereby return the stops to normal inoperative position. Fig. 13 indicates the normal position of each stop, while Fig. 14 shows one of the stops in position to coöperate with a descending matrix bar. The lowermost stop, however, which is shown in Fig. 15 may remain in the path of the descending matrix at all times and for this reason it is unnecessary to provide an actuating bar.

The actuating bars 39 are all reset or returned to normal position by a draw bar 39ª which is placed at the extreme right hand side of the keyboard, this draw bar 39ª being supplemental to those forming part of the keyboard proper, and it is operated by a supplemental bail rod 39ᵇ. This supplemental bail rod 39ᵇ is operatively connected to a link 39ᶜ which is guided to slide on the shiftable carrier 12 and it is connected by a link 39ᵈ to a pin 39ᵉ attached to the lower end of the oscillator F. The forward end of the supplemental draw bar 39ª is forked or formed into a yoke 39ᶠ which straddles the superposed actuating bars 39 and the forward ends of the arms of the fork or yoke 39ᶠ contain between them a roller 39ᵍ which is arranged in front of the actuating bars 39. Owing to the operative connection between the supplemental draw bar 39ª and the oscillator, each operation of the oscillator will draw the roller 39ᵍ rearwardly, thereby causing all of the actuating bars 39 to be simultaneously reset.

Each pawl 48 is capable of an independent movement in one direction within the blade 43 of the respective matrix-arresting stop. Consequently, when one of the arresting stops is operated by its respective bar 39 so as to occupy a position in the path of a descending matrix bar, the end of this pawl 48 will enter the recess $d$ in the bottom of the respective matrix bar, while the beveled surface 48ª on the pawl will coöperate with the beveled surface $f$ on the hook $e$ of the matrix. The pawl 48 will be thereby deflected so as to permit the hook $e$ to pass it whereupon the pawl 48 of the arresting stop will be immediately sprung into the space above the hook $e$ by its spring 49 with the result that the matrix bar is arrested at the proper elevation in its descent and without any possibility of its rebounding. While the pawl of the lowermost matrix-arresting stop remains at all times in the path of the descending matrices, the pawl nevertheless is capable of an independent movement which will permit it to have a latching engagement with the hook on the bottom of the matrix bar and thereby prevent rebounding of the matrix bar as in the previous instance.

The reciprocatory plunger 38ª serves to remove the matrix bars successively from the composing or assembling box and to transfer them successively upon the assembling bar. This plunger operates in a manner similar to that disclosed in the aforesaid patent although for convenience it reciprocates in the present instance through a slot in the rear wall of the composing box and it is operatively connected to a bell-crank lever 50, and this bell-crank lever in turn is actuated by the link 50ª at each operation of the oscillator, this link 50ª being pivotally connected to the lower portion of the oscillator frame for this purpose.

The present invention provides means whereby the composing box may be readily opened in order to enable a matrix bar to be removed in such cases, for instance, as when a mistake has been made in the selection of the matrix bar. As previously stated, the wings 37 of the composing box are pivoted on the centers 38, and I provide a simple and efficient device for simultaneously opening both wings. In the present instance, the wings are prolonged beyond the pivotal centers 38 to form the arms 51, and a pair of studs or projections 52 are fixed upon these arms. A bracket 53 is fixed to the body portion of the composing box and supports a pivoted retracting device 54. This retracting device may be in the form of a lever as shown, it being provided with a pair of reversely arranged slots 55 which are eccentric to the pivotal axis 56 of the retracting device, thereby forming cam surfaces which act simultaneously upon the studs or projections 52 on the wings and thereby open the latter as the retracting device is turned about its pivot. The wings of the composing box will be thereby opened and held in open position to enable the matrix bar to be conveniently removed and when the position of the retracting device is reversed, the wings of the composing box will close.

The retracting device is provided with an extension 57 which forms a handle to facilitate its manipulation. In order to limit the movement of the retracting device, I preferably provide a stud 64 on the bracket 53 which is adapted to coöperate with either of a pair of shoulders 65 and 66 which are formed in the retracting device adjacent to its center. These shoulders serve to limit the pivotal movement of the retracting device in both directions. The present invention also provides means for automatically retracting the detent which holds the assembling line of matrix bars when the wings of the composing box are opened. Any suitable connections between the wing-opening means and the detent may be employed for this purpose. In the present instance, I provide one end of the wing-retracting device 54 with an extension 58 which is adapted to coöperate with the forked end 59 of a lever 60, the latter being pivoted upon the body portion of the composing box at 61 and its opposite end coöperates with a rod 62, the latter extending through a slot 40ª in the wall 40 of the composing box and its end is adapted to coöperate with the beveled surface of the detent 63, the latter being pivoted in the face plate N. This spring-pressed detent 63 serves to retain the assembling line of matrix bars in proper position on the assembling rail. When, however, this detent is retracted by the rod 62, it releases the rearmost matrix bar in the line and thereby permits the same to be readily removed.

The mechanism for feeding the space bands into the assembling line is also carried by and shiftable with the carrier 12, and in order to maintain a suitable supply of space bands for the feeding mechanism when the carrier is in shifted position, a section of the space box is also shiftable with the carrier as previously stated. The space bands are fed to the assembling line through a slot or opening 69 which is located between the discharge end of the composing box and the face plate N as shown in detail in Figs. 18 and 19. The space bands as shown in Fig. 27 are provided with hooks *i* by means of which they are suspended in the space box, preparatory to being delivered to the assembling line. One section of the space box is formed in part by the plate 28 which is rigidly attached to and shiftable with the carrier 12. The face plate N which closes the forward side of the space box is also rigidly attached to and shiftable with the carrier. The plate 28 is provided with a sloping rail 67 which is adapted to coöperate with the hooks and thereby suspend the same in position ready to be fed one at a time into the assembling line when needed, the sloping arrangement of the rail causing the spacers to be fed successively into a position in alinement with the slot 69 by gravity. This slot, however, is normally closed by a gate 70 which also serves to present a smooth or uninterrupted connection between the composing box and the face plate N so that there will be no obstruction to the passage of the matrix bars. This gate is shown in detail in Fig. 11, it consisting of a plate which is normally pressed yieldingly into a position to close the space-feeding slot 69 by a spring-pressed plunger 78, and the rear edge of this plate is beveled at 70ᵇ to form an inclined surface for the engagement of the space band whereby the latter may deflect the gate 70 and thereby open it to permit the space band to be introduced into the assembling line. The gate 70 is also provided with a suitable number of tongues 70ᶜ which operate in recesses 70ᵈ formed in the adjacent surface of the face plate N, the forward surface of the gate and its tongues being flush with the surface of the face plate and the tongues serving to bridge the space between the face plate and gate. This gate 70 prevents the foremost spacer from falling forward or from being thrown out or displaced while being delivered, it coöperating with the forward edge of the space band and thereby causing the same to be fed in upright position into the assembling line, the frictional contact produced between the gate and the spacer causing the spacer to remain in proper contact with the space ejector. This space ejector in the present instance is in the form of a blade 71 (Fig. 10) which operates through a slot 72 formed between the wall 28 of the space box and the abutment wall 30 which serves to arrest the spacers while descending the sloping rail 67. This ejector blade 71 is carried by a bar 73, the bar being guided to reciprocate in a slot in the comb block 22 at its forward end and in a comb block 74 toward its rear end.

The upper side of the bar 73 is provided with a lug 75, and a tension spring 76 is attached at one end to this lug 75 and at its opposite end it is attached to the relatively stationary comb block 22, this spring acting to throw the bar 73 and also the blade 71 forward to introduce a space band into the assembling line. A lug 77 is formed on the under side of the bar 73 and is adapted to abut against the comb block 22 and thereby limit the forward motion of the space ejector. The space ejector, however, is normally held in retracted or inoperative position by a latch which is under the control of a suitable key on the keyboard. This latch in the present instance consists of a shoulder which is formed by a notch 78 in the under side of the bar 73 and a correspondingly shaped detent 79 formed on one arm of a bell-crank lever 80, the latter being pivoted to a suitable part on the carrier 12 at 91. When the space ejector is retracted, the detent 79 snaps into the notch 78 in the bar 73 and thereby retains the ejector in such position until it is released from the keyboard whereupon the ejector flies forward under the action of the spring 76.

The space ejector may be conveniently retracted or reset after each operation by the oscillator which resets the magazine pawls. For this purpose, the rear end of the bar 73 is provided with an upturned projection 81 which is placed in rear of a roller or projection 85 attached to a lever 84, the latter extending through a slot 83 formed in the shiftable carrier 12 and is rotatable about a pivot 82 fixed to the carrier as shown in Fig. 10. The lever 84 is provided with a spring for returning it to normal position, the upper end of the lever 84 having a hook 87 formed thereon, and a tension spring 89 is inserted between this hook 87 on the arm 84 and an eye 88 attached to the bracket 15 on the shiftable carrier. The lower portion of the frame 1 of the oscillator is provided with a roller 90 and the forward side of the lever 84 bears against this roller 90 under the action of the spring 89. A releasing of the bar 73 due to a rocking movement of the bell-crank lever 80 will permit the bar 73 and the blade 71 attached thereto to move forward and thereby introduce a space band into the assembling line. The forward motion of the bar 73 will also cause the upturned projection 81 on the end thereof to strike the roller or projection 85 on the lever 84, the latter being thereby shifted forward and due to its engagement with the roller 90 on the oscillator, the latter will be tilted to set the eccentric gear 6 thereon into operation and the bar 73 will be reset in retracted position.

The operation of the space ejector is under the control of a key of the keyboard. Any suitable operative connection between the parts may be provided for accomplishing this result. In the present instance, I provide a blade 93 which is located below the shiftable carrier 12 and is carried by a shaft 94 which is journaled in suitable bearing brackets 95 which latter are secured rigidly to a part of the fixed or non-movable frame of the machine. The bell-crank 80 is normally held in locked position and in contact with the blade 93 by a spring 96 suitably housed in the bracket 15 which is fixed to the shiftable carrier. The shaft 94 is provided with a crank arm 98 and a link 99 is connected to the crank. This link is preferably sunk in a recess 100 formed in the face of the frame so as to present a smooth or unobstructed surface to facilitate the application of the keyboard. The lower end of the link 99 is attached at 101 to a lever 102, and this lever 102 is provided with a suitable key which forms a part of the keyboard. From the foregoing description, it will be obvious that it is only necessary for the operator to depress the key on the lever 102 to perform the operation of feeding a space band to the assembling line, the space feeding mechanism being automatically reset. When the blade 71 of the space feeding mechanism is retracted after delivering a space band to the assembling line, the foremost space band suspended on the sloping rail 67 will move into a position in front of the blade and in readiness to be introduced into the assembling line upon the next operation of the blade. The spring 89 serves to hold the oscillator as well as the lever 84 in normal position. In order that the tripping blade 93 of the spacing mechanism may remain in operative relation with the bell-crank lever 80 irrespective of the position occupied by the shiftable carrier, this blade is elongated in the direction of the shifting movement of the carrier.

According to the present invention, the operation of the space feeding mechanism also effects the automatic operation of the means for returning the space bands to the space box. In the present instance, the blade 71 of the spacing mechanism is provided with a rearwardly extending arm 103 such arm carrying a laterally extending rod 104 as shown in Figs. 5 and 10. This rod is straddled by the forked end 105 of an arm 106 forming part of a bell-crank lever, this bell-crank lever being pivoted at 107 upon lugs 108 supported by a stationary bracket 109, and the other arm 110 of the bell-crank lever extends through a slot formed in the casing 111 closing the upper portion of the space box and is pivotally connected to a link 112. The upper end of the link 112 is pivotally connected to a lever 113, this lever being pivoted at 114 to the casing 111, and the opposite end of the lever 113 is provided with a rounded head 115 which operates in a forked socket 116 formed in a slidable block 117. This block may be guided to slide vertically in any suitable manner, it being slotted at 118 in the present instance and provided with screws 119 which operate in such slots and thereby guide the block for vertical rectilinear movement. The block 117 carries an arm 120, a portion of this arm being extended downwardly and forming a presser foot 121. The space bands are returned to the space box by a wire or rail 122, this rail terminating just below the adjacent face of the presser foot 121. Any space bands that may accumulate on the wire 122 which slopes downwardly toward its interrupted end are retained by a finger 123, this finger having its lower portion curved laterally so as to bear endwise against the end of the wire or rail 122, and this finger is pivoted at 125 to the plate or casing 111, a spring 125ᵃ acting to yieldably press the finger against the discharge end of the rail or wire 122. The arm 120 which is attached to the vertically slidable block 117 and which carries the presser foot 121 is curved or bent so as to clear the retaining finger. Below the retaining finger 123 is formed an inclined chute 126 which leads into the rear stationary section of the space box, this chute being preferably formed as a part of the plate or casing 111 and it has an extension 127 leading from a point immediately below the retaining finger. A curved guard 128 is also preferably formed as a part of the chute, the guard serving to direct the lower ends of the space bands so that they will enter the chute 126 with certainty when released from the retaining finger.

In operation, when the space bands are returned from the casting point and are elevated by the distributer, they gravitate along the rail 122, the foremost space band hanging by its hook upon the curved lower end of the retaining finger 123 and with its hook immediately below the presser foot 121 which is normally in elevated position. At each delivery movement of the feeding blade, however, the link 112 will be raised, causing the slide block 117 to descend, thereby carrying the presser foot 121 into engagement with the hook on the top of the foremost space band hanging upon the curved lower end of the finger 123, and the pressure thus produced upon the foremost space band will overcome the action of the spring 125$^a$, thereby causing the retaining finger to be deflected so as to release its hold upon the space band and the latter will then drop by gravity into the chute 126. Immediately upon the dropping of the space band, the spring-pressed retaining finger 123 will return to normal position to catch the next space band on the rail 122 and when the space feeding mechanism is restored to normal position by the oscillator, the presser foot 121 will rise and will be in position to engage and introduce the next space band into the space box. In this manner, a proper supply of space bands is maintained in the space box at all times, one space band being introduced into the space box each time a space band is delivered into the assembling line. In order to assist the operation of the presser foot in introducing a space band into the space box, a tension spring 129 may be attached to the lever 113, this spring, however, being normally held from operation by the detent which holds the space feeding blade 71 in retracted position.

Each space band as it drops into the chute 126 enters the rear stationary section of the space box, this section of the space box being closed at one side by a plate 141 which is fixed to the stationary part of the machine frame, also by a plate 142 which forms a substantial continuation of one wall of the chute 126 and by the face plate N which is attached to and shiftable with the carrier. The wall 142 forming part of the rear section of the space box is provided with a downwardly inclined lug 143 which is adapted to engage the lug $h$ on the space band and thereby deflect the upper portion of the space band into a position to cause its hook $i$ to engage an inclined rail 144 which is fixed to the stationary plate 141 and forms a continuation of the rail 67 on the shiftable plate 28 when the shiftable carrier is in normal or non-shifted position. When the rails 67 and 144 are in alinement, as shown in Fig. 9, the space bands as they are returned to the space box may descend by gravity along the rail 144 and are then transferred to the rail 67. When, however, the carrier and the mechanism carried thereby is shifted, the rail 144 is disconnected from the rail 67, as shown in Fig. 2, the rail 67 which is attached to the movable plate 28 forming one section of the space box which travels with the carrier and it is adapted to contain the necessary number of space bands. According to the present invention, I provide an automatically operative device for holding back the space bands as they accumulate upon the stationary rail 144 when the carrier is in shifted position and to release the space bands thus accumulated and permit them to pass upon the rail 67 when the carrier and its operative parts are returned to normal or non-shifted position. This device in the present instance consists of a detent 145 which is pivoted at 146 to a part of the stationary plate 141, and the operative end of the detent is held down upon the rail 144 by a spring 147. The detent is also provided with a depending shoulder 148 which is adapted to be engaged by the block 29 which is shiftable with the plate 28. While the carrier and its associated parts are in normal or non-shifted position, the two sections of the space box are united and the block 29 will coöperate with the shoulder 148 on the detent and will thereby hold the latter in an inoperative position and, consequently, the space bands may be transferred freely from the stationary rail 144 to the shiftable rail 67. When, however, the carrier and its associated parts are shifted, the block 29 which is movable therewith will disengage from the shoulder 148 on the detent and the latter will be thereby permitted to move into engagement with the lower end of the stationary rail 144 so as to hold back the space bands as they accumulate thereon.

Any suitable means may be provided for shifting the carrier and its associated parts whereby matrices may be selected and delivered from each section of the magazine. In the present instance, the under side of the shiftable carrier is provided with lugs 130, links 131 are pivotally connected to such lugs, and these links in turn are pivotally connected to a pair of arms 132 which are fixed to a rock shaft 133. The forward end of this rock shaft may be journaled in the forward part of the machine frame, and a bearing 134 may be provided for the rear end of this shaft. Obviously, the carrier and its associated mechanisms will be shifted longitudinally upon the guide rails 13 by a rocking movement of the shaft 133. In order to facilitate the shifting operation of the carrier by the operator, I provide the rock shaft with a handle 135 which is adjacent to the keyboard, as shown in Fig. 1. Any suitable means may be provided for locking the shaft 133 and the carrier in either position. In the present instance, I provide a clutch which consists of a ring 136 which is splined to the shaft 133 and provided with a tooth or projection 137 which is adapted to engage one or another of the notches 138 formed in a boss 139 on the machine frame. The ring 136 is engaged and disengaged with the notches in the boss by a shifting movement thereof in a direction axially of the shaft. In the present instance, a link 140 is connected to the ring 136 and it is operatively connected to a grip 140ᵃ, this grip being pivotally connected to the handle 135 by means of which the shaft is rotated to shift the carrier.

The matrices are ejected laterally from the composing box and toward the left in Fig. 1 whereupon they pass the spring-pressed detent 63 and the face plate N and the detent 149 below the assembling rail, the matrices being first assembled on the assembling rail by means of an assembling carriage and are thereupon transferred to an alining bar at which point the casting operation takes place in a manner similar to that disclosed in the patent above mentioned. In the present instance, I provide an assembling bar P one end of which is attached to the composing box by a lug 152 whereby the same may shift with the composing box and thereby remain in operative relation therewith irrespective of whether the carrier is in normal or shifted position. That edge of the assembling bar which coöperates with the matrix bars is provided with an upturned rounded rib 153 which corresponds in shape to and is adapted to engage in the pocket or rounded recess c formed in the matrix bar. This rib 153 thereby supports the matrix bars on the surface provided by the pocket or recess c and in this way, wear upon the upper and lower surfaces of the notches b in the matrix bars is avoided. The assembling rail P is slidably supported on a bar 154, it being provided with longitudinal slots 155 which are adapted to coöperate with screws so that the slidable assembling bar will maintain a proper relation with the alining bar and related mechanism. Furthermore, the under side of the slidable assembling bar P is undercut or grooved as at 157 so as to rest upon the top of the bar 154, and a flange 156 on the under side of the slidable bar P is seated in a rabbet 156ᵃ formed in the top of the bar 154. That portion of the assembling bar which enters the notch b in the matrix is smaller than the notch so that it does not touch the upper or lower wall thereof, as shown diagrammatically in Fig. 22, the upturned rounded rib 153 serving as the riding surface for the matrices. The rounded rib 153 on the rail P also extends into the composing box a sufficient distance to receive the matrices therefrom. On the upper surface of the assembling bar P is fastened one end of the plate 159, this plate extending the full length of the assembling bar and nearly to the casting point, and on this plate is mounted a carriage Q which is operated during the assembling of a line of matrices. In the present instance, the plate 159 is provided with a pair of bearing brackets 160 and 161 which support between them a tube 162, and a ring 163 is mounted to slide longitudinally and to rotate upon the tube. This ring 163 is provided with a finger 164 the end of which is downturned and is adapted to occupy a position immediately beside the curved rib 153 during the assembling of the line of matrices. The ring 163 is also provided with a releasing shoulder 165. A pin 166 is also attached to the ring 163 and extends through a slot 167 which extends longitudinally of the tube 162. A coiled compression spring 168 is contained within the tube 162 and bears against the pin 166 in such a way that the finger 164 on the ring will yieldably resist the movement of the matrices during the assembling operation. A spring 169 also surrounds the tube 162, one end of this spring being attached to the tube while its opposite end is attached to the bearing bracket 161. This spring normally acts to turn the tube 162 in a direction to lift the finger 164 and thereby release an assembled line of matrices. A device, however, is provided for normally resisting the action of the spring 169 and for retaining the finger 164 in the line of movement of the matrices, this retaining device being automatically tripped by the shoulder 165 on the ring 163 when a line of matrices of the proper length has been assembled. In the present instance, the shiftable assembling rail P carries a rib 170 to which a bracket 171 is clamped by a screw 172. The bracket 171 carries a pawl 173 which has a projection 173ᵃ which depends into the longitudinal slot 167 in the tube and thereby serves to retain the finger 164 in the path of the assembling line of matrices. The pawl 173 is provided with a tripping finger 174 the under side of which is inclined, and this tripping finger is in the path of movement of the shoulder 165 on the ring 163. The ring 163 has a receding movement during the assembling of the line of matrices on the bar P, and when the ring 163 reaches a predetermined position, the shoulder 165 thereon will lift the pawl 173 and thereby disengage the projection 173ª on the pawl 173 from the slot 167 in the tube, the tube being thereby released and the spring 169 will act to turn the tube and thereby lift the finger 164 clear of the line of assembling matrices. The bracket 171 which carries the pawl 173 may be placed at different distances along the flange or rib 170 in order that the machine may operate to compose lines of matrices of the desired length.

When the finger 164 is swung clear of the line of assembled matrices, it has a tendency to return immediately to normal position under the action of its spring 168. The return movement of the finger 164, however, is delayed in order that the line of matrices may be transferred from the rail P to an alining rail S. This result is accomplished in the present instance by a dog 175 which is attached to the bracket 171 carrying the pawl 173, this dog having a beveled surface 176 on its under side which is adapted to be engaged and lifted by a projection 177 forming a part of the matrix-transferring carriage 178. When the arm 164 swings clear of the line of matrices, it is engaged and held from return movement by the dog 175, as shown in Fig. 24. The operation of the carriage 178 in transferring the line of matrices to the casting point, however, causes a lifting of the dog 175 under the action of the projection 177, the lug 165 being thereby released and the ring 163 with its arm or finger 164 may then return to a position to receive the next line of assembling matrices. The bar 154 also supports the rail S which does not shift with the carrier 12, the rail being provided for a portion of its length with an upturned rounded rib 182 which is a counterpart and a continuation of the rib 153 on the bar P. The remainder of the rail S, however, has a rectangular edge which is of a thickness that will insure a precise fit between it and the upper and lower walls of the notches b formed in the edge of the matrices. This rail S is capable of a movement transversely of the bar 154 so that it may engage and disengage the notches of the matrices while the same are at the casting point, as shown in Fig. 25, the matrices being thereby alined precisely so as to insure a proper casting operation.

Ordinarily, the carrier and its associated mechanisms will occupy a position toward the left of the machine as shown in Fig. 1 in which position matrices will be selected and delivered from that section of the magazine which contains the matrix font which is most commonly used. When the carrier is in this position, which may be regarded for the present purposes as a non-shifted position, the assembling bar P which is attached to the composing box and is shiftable with the carrier abuts at its end against the adjacent end of the alining bar S, the riding ribs 153 and 182 for the matrices at this time being continuous or practically uninterrupted so that the line of matrices assembled on the bar P may be immediately transferred to the bar S, the matrices being subsequently conveyed to the casting point and the casting operation may be performed in any suitable or well known manner such, for instance, as that disclosed in the patent hereinbefore mentioned. In order to introduce into the assembling line matrices from the other font, it is only necessary to shift the carrier and its associated mechanisms by the handle adjacent to the keyboard. When the carrier is shifted, the bar P is separated from the adjacent end of the bar S as shown in Fig. 21, the line of matrices being assembled upon the bar P. Upon the completion of the line, however, the carrier and its associated mechanisms is returned to its normal or non-shifted position whereupon the bar P is brought into coöperative relation with the bar S, the line of matrices being then conveyed to the casting point as in the preceding instance. A cam 180 is attached to the forward edge of the bar P and is operative upon the shoulder 165 to return the arm or finger 164 into the path of the assembling line of matrices while the ring 163 is returning to its normal position under the action of the spring 168.

The operation of the machine may be briefly described as follows:—Assuming that the machine is adapted to contain matrices for two fonts, it will be understood that the carrier and its associated mechanisms is shiftable in such a manner that it may occupy either one of two different positions. This carrier contains a set of detent levers which is of a number corresponding to the number of magazine pawls and detents for one section of the magazine which holds one complete font of matrices, the detent levers being shiftable transversely with the carrier and beneath the detents so that when the carrier occupies one position the detents will be in coöperative relation with one set of detents whereby matrices of one font may be selected and delivered from this particular section of the magazine by the keyboard, the remaining detents for the other section of the magazine at this time being inactive, and when the carrier is shifted into its other position, the detent levers thereon will be placed in coöperative relation with the detents for the second section of the magazine so that matrices may be delivered therefrom by manipulation of the same keyboard, the actuating bars for the detent levers which are shiftable with the carrier remaining in coöperative relation with the keyboard mechanism owing to the prolongation of the bail rods. In most cases, the matrices for setting up the matter will be drawn almost wholly from one section of the magazine which in the present instance will be the section G in Fig. 1, it being necessary to draw matrices from the other section H of the magazine only in those cases where a different size or style of type is called for. Therefore, the shiftable section of the machine is preferably adapted to normally occupy the position shown in Fig. 1 in which case the assembling bar P and the alining bar S will be in coöperative relation and the two sections of the space box will be united to form in effect a single unit. When the parts are in their normal or non-shifted position, the matrices are selected and delivered from the respective section of the magazine by manipulation of the keyboard which actuates the detent levers and permits opening movement of the corresponding magazine pawls in the manner disclosed in the prior patent aforesaid. When, however, it is necessary to introduce matrices into the line from the second storage space or section of the magazine, it is only necessary for the operator to release the grip 140ᵃ and to rotate the handle 135 on the shaft 133, the carrier and its associated mechanisms being thereby shifted and they are locked in shifted position by the notch and recess engagement between the ring or collar 136 and the boss 139. When the carrier is shifted in this manner, the detent levers are carried out of an operative relation with the detents for the pawls of the magazine section G and are introduced into coöperative relation with the second set of detent levers which control the pawls for the magazine section H which contains matrices of the second font. The composing box which is attached to the carrier shifts therewith, it being transferred from a position immediately beneath the magazine section G to a position immediately beneath the outlet for the magazine section H so that the matrices may drop into the composing box by a most direct movement irrespective of which section of the magazine is being operated. The shifting movement of the carrier also causes a relative separation between the two sections of the space box, the detent 145 which is carried by the stationary section of the space box dropping upon the rail 144 and thereby holding back any space bands that may accumulate thereon, while the rail section 67 which is carried by the shiftable section of the space box separates from the rail 144 and carries with it a sufficient number of space bands for use in the line. The mechanism for introducing the space bands into the line which includes the blade 71 is mounted on and shiftable with the carrier and that section of the space box which contains the rail 67 remains in coöperative relation with the space feeding mechanism, and this arrangement insures a proper supply of space bands to complete a line while the carrier and its associated mechanisms is in shifted position. The space feeding mechanism remains in operative relation with the keyboard owing to the elongated formation of the actuating blade 95. The oscillator which serves to reset the magazine pawls and also the space feeding mechanism is mounted on and shiftable with the carrier and it remains in coöperative relation with these mechanisms.

When the necessary number of matrices have been withdrawn from the magazine section H, the carrier is returned to its normal or non-shifted position by manipulation of the handle 135 adjacent to the keyboard. The return of the carrier and its associated mechanisms to normal position brings the bar P into coöperative relation with the bar S whereby the line of assembled matrices may be transferred from the bar P to the bar S and suitably conveyed to the casting point. The return of the carrier to normal position also reunites the sections of the space box, the suspending rail 67 carried by the shiftable section of the space box being returned to a position in alinement with the stationary rail section 144 and the block 29 on the shiftable section coöperates with the shoulder 148 on the detent 145, thereby causing the latter to be automatically lifted so as to permit such bands as may accumulate on the rail 144 to descend and enter upon the rail 67.

I claim as my invention:

1. In a composing machine, the combination of a magazine adapted to contain a plurality of fonts of matrices, a set of matrix delivery gates and controlling devices for each font, a keyboard, a set of releasing devices operatively associated with the keyboard and capable of being positioned to coöperate with and release the controlling devices to cause delivery of matrices from one or another font, and a composing box shiftable to receive matrices of one or another font.

2. In a monoline composing machine, the combination of a magazine adapted to contain a plurality of fonts of matrices, a set of matrix delivery gates and controlling detents for each font, a keyboard, a set of releasing devices shiftable into operative relation with the controlling detents for one or another font and adapted to maintain an operative connection with the keyboard, and a composing box shiftable with said releasing devices and positioned to receive matrices of one or another font.

3. In a monoline composing machine, the combination of a magazine divided into sections adapted to contain a plurality of fonts of matrices, a set of matrix delivery gates and controlling devices for each section of the magazine, a keyboard, and a carrier shiftable relatively to the magazine and keyboard and carrying releasing devices which maintain an operative connection with the keyboard and are adapted to be positioned to coöperate with one or another set of controlling devices whereby matrices may be selected and delivered from one or another font, said carrier also carrying a composing box which is shiftable to receive matrices from one or another section of the magazine.

4. In a monoline composing machine, the combination of a stationary magazine having channels adapted to contain a plurality of fonts of matrices, a set of matrix delivery gates and controlling devices for each font, a relatively stationary keyboard, and a carrier shiftable beneath the magazine and supporting a set of releasing devices which maintain an operative connection with the keyboard and are adapted to be positioned to coöperate with the controlling devices for the matrices of one or another font, and a composing box shiftable with the carrier and adapted to be positioned to receive matrices of one or another font.

5. In a monoline composing machine, the combination of a magazine having channels to contain a plurality of fonts of matrices, a set of matrix delivery gates and controlling devices for each font, a keyboard, a carrier shiftable relatively to the magazine and carrying releasing devices whereby the same may be positioned to coöperate with the controlling devices for one or another font, and a resetting device for the matrix delivery gates mounted on and shiftable with said carrier.

6. In a composing machine, the combination of a magazine adapted to contain a plurality of fonts of matrices, a set of matrix delivery gates and controlling devices for each font, a keyboard, a set of releasing devices operatively connected to the keyboard and capable of being positioned to coöperate with and release the controlling devices to cause the delivery of matrices of one or another font, a composing box shiftable with said releasing devices to receive matrices of one or another font, an alining bar, and an assembling bar, the latter being attached to and shiftable with the composing box and adapted to coöperate with the alining bar when the composing box occupies a predetermined position.

7. In a monoline composing machine, the combination of a magazine adapted to contain a plurality of fonts of matrices, a set of matrix delivery gates and controlling devices for each font, a keyboard, a carrier shiftable relatively to the magazine and supporting a set of releasing devices which maintain an operative connection with the keyboard during the shifting movements of the carrier and are adapted by such shifting movements of the carrier to be operatively positioned with respect to the controlling devices for one or another font, space feeding mechanism shiftable with the carrier, and a space box a section of which is shiftable with the carrier and is adapted to supply spacers to the space feeding mechanism.

8. In a monoline composing machine, the combination of a magazine adapted to contain a plurality of fonts of matrices, a set of matrix delivery gates and controlling devices for each font, a keyboard, a carrier shiftable relatively to the magazine and supporting a set of releasing devices capable of operating upon the controlling devices for one or another font, space feeding mechanism shiftable with the carrier, and a space box divided into sections one section of which is shiftable with the carrier and provides a storage chamber for the spacers, and means for controlling the supply of spacers to the shiftable storage chamber from the other section of the space box.

9. In a monoline composing machine, a composing box adapted to receive multiple letter matrices, said box having a movable section adapted to be opened to permit removal of a matrix therefrom, an ejector for discharging matrices from said box, and a retracting device coöperative with said movable section and operative independently of said ejector to open such section and retain it in open position.

10. In a monoline composing machine, a composing box adapted to receive multiple letter matrices and embodying a pair of movable wings having opposed projections thereon and adapted to be opened to permit the removal of a matrix therefrom, and a pivoted manually operative retracting device having means to coöperate with the projections on both of said wings to open them and hold the same in open position.

11. In a monoline composing machine, a composing box having a pair of opposed pivoted wings adapted to be opened to permit the removal of a matrix therefrom, the wings having similarly located projections thereon arranged to approach one another when the wings are opened, and a retracting device turnable on a relatively fixed pivot and operative to simultaneously engage said projections and open the wings.

12. In a monoline composing machine, a composing box having a pair of opposed pivoted wings capable of being opened to permit the removal of a matrix from the box, said wings having similarly located projections, and a pivoted retracting device having cam-shaped portions adapted when said device is turned to coöperate simultaneously with the projections on the wings to open the latter and retain them in open position.

13. In a monoline composing machine, the combination of a composing box having a movable wing adapted to be opened to permit the removal of a matrix therefrom, a retracting device to operate said wing, an assembling bar and coöperative detent for receiving and holding the matrices as they are assembled by the composing box, and an operative connection between said detent and retracting device whereby movement of the latter to open the composing box will automatically retract said detent.

14. In a monoline composing machine, a composing box adapted to receive multiple letter matrices embodying a set of superposed matrix-arresting stops each having a yieldable and laterally movable pawl in combination with a matrix bar having a hook-shaped portion at the bottom thereof to coöperate with said pawl whereby the latter will arrest the movement of the matrix bar and will prevent rebounding thereof.

15. In a monoline composing machine, the combination of a composing box containing a set of superposed stops, each having a laterally yieldable pawl and a multiple letter matrix bar provided with a hook-shaped portion arranged to first deflect said pawl laterally and to then receive such pawl whereby the matrix bar will be arrested at the proper elevation without rebounding.

16. In a composing box for monoline composing machines, a matrix-arresting stop comprising a pivoted member, and a pawl carried by and capable of a limited movement relatively to said member and adapted to be positioned in the path of movement of a matrix bar by said member.

17. In a monoline composing machine, a composing box adapted to receive multiple letter matrix bars and embodying a set of superposed matrix-arresting stops, certain of said stops embodying a shiftable member, a pawl carried by and capable of a limited independent movement relatively to said member, and a spring interposed between the member and pawl for yieldably holding the latter in a predetermined position.

18. In a monoline composing machine, the combination of a composing box containing a set of superposed matrix-arresting stops, each stop having a pawl which is capable of a limited independent movement and provided with a beveled edge, and a multiple letter matrix bar provided at its lower end with a hook a portion of which is beveled to coöperate with the beveled portion of the pawl to deflect the pawl laterally and permit the pawl to interlock with the hook.

19. In a monoline composing machine, the combination of an assembling bar, a face plate opposite to said assembling bar and provided with a space feeding passage, a space box for supplying spacers to such passage, and a horizontally reciprocatory space feeding device adapted to receive spacers from the space box and to eject them laterally through such passage in the face plate to the assembling bar.

20. In a monoline composing machine, the combination of an assembling bar, an opposed face plate provided with a passage for spacers, and a space ejector operative to move a spacer laterally through such passage in the face plate and to introduce it to the assembling bar.

21. In a monoline composing machine, the combination of an assembling bar, an opposed face plate provided with a passage for spacers, a space ejector mounted to reciprocate through said passage and operative to eject spacers laterally therethrough and to the assembling bar, and means to frictionally engage the spacer to control its movement while passing through such passage.

22. In a monoline composing machine, the combination of an assembling bar, an opposed face plate provided with a passage for spacers, a yieldable gate arranged to frictionally coöperate with the spacers while passing through said passage, and a horizontally movable ejector for forcing the spacers laterally through such passage.

23. In a composing machine, the combination of an assembling bar, an opposed face plate provided with a passage for spacers, a space box, a yieldable gate normally closing said passage and provided with a vertical beveled surface, and a horizontally reciprocatory ejector adapted to remove spacers successively from the space box and to force them laterally through said passage to the assembling bar, each spacer being adapted to coöperate with the beveled surface on the gate to deflect the latter and permit the passage thereof.

24. In a monoline composing machine, the combination of an assembling bar, an opposed face plate provided with a passage for spacers, a space box for supplying spacers successively to such passage, a spring-pressed gate normally closing the passage in said face plate and forming a flush surface on the front thereof, and a horizontally reciprocatory ejector operative through the passage in the face plate and adapted to remove spacers successively from the space box and to transfer them by a lateral movement to the assembling bar.

25. In a monoline composing machine, the combination of a magazine to contain the matrices and having spring-retracted delivery gates, means for releasing the delivery gates to permit opening movement thereof, a space box, a reciprocatory device for feeding spacers from said box, a resetting device capable of restoring the delivery gates of the magazine and also the space feeding device to normal position, and an arm coöperative with the space feeding device and the resetting device and having a spring acting thereon to hold the resetting device in normal position.

26. In a monoline composing machine, the combination of a magazine provided with spring-retracted delivery gates, mechanism for releasing the gates, a space box, a reciprocatory space feeding bar coöperative with the space box, a mechanism for restoring the magazine delivery gates to normal position after being released, an arm for operatively connecting said mechanism to the space feeding bar whereby movement of such bar toward actuated position will set the restoring mechanism into operation, and a spring acting on said arm to retain the restoring mechanism in normal position.

27. In a monoline composing machine, the combination of a magazine provided with matrix delivery gates and controlling devices therefor, a keyboard, a carrier shiftable relatively to the keyboard and magazine and carrying devices for releasing the controlling devices for the delivery gates of the magazine, space feeding mechanism carried by and shiftable with said carrier and embodying a controlling device, and means for maintaining an operative connection between the controlling device of the space feeding mechanism and the keyboard irrespective of the shifting movements of the carrier.

28. In a monoline composing machine, the combination of a magazine provided with matrix delivery gates and controlling devices therefor, a keyboard, a carrier shiftable relatively to the magazine and keyboard and provided with devices for releasing the controlling devices for the gates, a composing box shiftable with said carrier to receive matrices from the magazine, an assembling bar shiftable with the composing box and adapted to receive matrices therefrom, and a face plate opposed to the assembling bar and also shiftable with the composing box and carrier.

29. In a composing machine, the combination of a shiftable composing box, an assembling bar and an opposed face plate shiftable with the composing box, space feeding mechanism also shiftable with the composing box and operative to supply space bands to the assembling bar, and a space box divided into sections one of which is relatively stationary and the other is shiftable with the composing box and its associated mechanisms, the shiftable section of the space box forming a storage chamber for the space bands and the relatively stationary section being adapted to supply space bands to the shiftable section, and means for controlling the transfer of space bands from the stationary to the shiftable section of the space box embodying a detent normally operative to hold the space bands in the stationary section and having a part adapted to be engaged by a portion of the shiftable section for moving the detent into inoperative position.

30. In a composing machine, the combination of a space box provided with a receiving chute, a rail for conducting space bands to said chute, a retaining finger normally supporting the foremost space band after it has left said rail and in a position above the receiving chute of the space box, and a device operative to deflect said retaining finger and cause the space band to enter the chute.

31. In a composing machine, the combination of a space box provided with a receiving chute, an inclined rail to conduct space bands to said chute, a spring-pressed retaining finger having an offset end to receive and support thereon a space band at the entrance of the chute, and a presser foot operative to engage the top of the space band on said finger and thereby exert a pressure on the space band sufficient to deflect the finger to permit the space band to enter the chute.

32. In a composing machine, the combination of a space box having a receiving chute for space bands, an ejector for removing the space bands from said box, a rail for returning the space bands to the receiving chute, a retaining finger coöperative with said rail to successively receive the space bands from the rail and support them at the entrance of the chute, and means operative by said ejector for disengaging a space band from said retaining finger and causing it to enter the chute.

33. In a composing machine, the combination of a composing box, an assembling bar coöperative therewith, and a carriage for controlling the assembling of the matrices on said bar embodying a finger adapted to be engaged by the foremost matrix in the assembling line and capable of a receding movement, a device for holding said finger in the path of the assembling line of matrices and arranged to be released automatically by said finger to permit said finger to move out of the path of the assembling line of matrices when the line of matrices has reached a predetermined length, and means for returning said finger to initial position preparatory to the assembling of the next line of matrices.

34. In a composing machine, the combination of a composing box, an assembling bar coöperative therewith and adapted to receive and assemble matrices, a finger adapted to occupy a position in the path of the assembling line of matrices, means normally tending to swing said finger clear of the line of matrices, a pawl for normally holding said means from operation and releasable automatically by said finger when said finger has receded to a predetermined position, and means for returning said finger to a position to be engaged by the next line of matrices.

35. In a composing machine, the combination of a composing box, an assembling bar to receive the matrices therefrom, a rotatable tube supported in coöperative relation with the assembling bar, a finger slidable axially on said tube and rotatable therewith, said finger adapted to occupy a position in the path of movement of the assembling matrices, a spring normally acting to return said finger to its initial position, a spring normally tending to rotate the tube and thereby swing said finger clear of the assembled line of matrices, a pawl coöperative with the tube to prevent rotation thereof and releasable automatically when said finger has been retracted to a predetermined position whereby said finger may swing clear of the assembled line of matrices, a device for preventing a return movement of said finger, and a transfer carriage operative to release the finger and permit the same to return to initial position.

36. In a composing machine, the combination of a matrix bar provided with an alining notch having opposed upper and lower alining surfaces and also having a riding surface independent of the surfaces first mentioned, and an assembling bar having a riding surface to engage that on the matrix and shaped to clear the alining surfaces of the notch.

37. In a monoline composing machine, the combination of a matrix bar provided with a notch having upper and lower alining surfaces and also having a curved recess formed inwardly beyond the upper alining surface, an assembling bar having a raised rib thereon adapted to engage and form a riding surface for the said recess in the notch of the matrix bar, and an alining bar having a portion to enter the notch of the matrix bar and to coöperate with the upper and lower alining surfaces thereof.

38. In a monoline composing machine, the combination of a magazine provided with matrix containing channels and matrix delivery gates and controlling devices therefor, a keyboard, means operative by the keyboard for releasing said gates and delivering matrices from the magazine, a composing box shiftable relatively to the matrix containing channels of the magazine, a set of matrix arresting stops shiftable with the composing box, and a set of actuating bars adapted to be set by the keyboard and capable of maintaining an operative connection with the stops of the composing box during the shifting movements of the box.

39. In a monoline composing machine, the combination of a magazine adapted to contain matrices of a plurality of fonts, delivery gates, detents individual to the matrices of each font, and a set of longitudinally reciprocatory keyboard actuated bars shiftable laterally into operative relation with the detents for matrices of one or another font.

40. In a monoline composing machine, the combination of a magazine provided with channels to contain matrices of a plurality of fonts, a delivery gate and detent for each magazine channel, a set of longitudinally reciprocable actuating bars for the detents, and means for bodily shifting said bars laterally to bring the operative portions thereof into coöperative relation with the detents of one or another font.

41. In a monoline composing machine, the combination of a magazine having a plurality of sets of channels, each set to contain matrices of a different font, a set of delivery gates and detents for each set of magazine channels, and a set of longitudinally reciprocable actuating bars which are shiftable transversely whereby they may be positioned to coöperate with the detents of one or another set.

42. In a monoline composing machine, the combination of a magazine provided with channels to contain multiple letter matrices, means for selecting and delivering matrices from the respective channels of the magazine, a shiftable composing box having means for positioning it beneath different channels of the magazine, and stops arranged to coöperate with the matrices as they enter the composing box to position the matrices at the proper elevations.

43. In a monoline composing machine, the combination of a magazine provided with channels to contain multiple letter matrices, means for selecting and delivering matrices from the respective channels of the magazine, a shiftable composing box having means for positioning it to receive matrices from different magazine channels, and stops coöperative with the matrices upon entering the composing box to position them according to the letters or characters selected, said stops being also controlled by the matrix selecting means.

In testimony whereof I have hereunto set my hand in presence of two subscribing witnesses.

WILLIAM ERNEST BERTRAM.

Witnesses:
    CLARENCE A. BATEMAN,
    CHAS. S. HYER.

Copies of this patent may be obtained for five cents each, by addressing the "Commissioner of Patents, Washington, D. C."